NEGATIVE RESISTANCE NETWORK

Filed Nov. 17, 1966

*INVENTORS*
HENRY J. ORCHARD
WILLIAM N. LEE
*BY*
Bernard E. Franz
ATTY.

3,470,500
Patented Sept. 30, 1969

3,470,500

NEGATIVE RESISTANCE NETWORK

Henry J. Orchard, San Mateo, and William N. Lee, Burlingame, Calif., assignors to Automatic Electric Laboratories, Inc., a corporation of Delaware Filed Nov. 17, 1966, Ser. No. 595,222
Int. Cl. H01p 1/24
U.S. Cl. 333—80 9 Claims

ABSTRACT OF THE DISCLOSURE

With only two transistors and five resistors, a short-circuit stable negative resistance is obtained. It may be used to cancel the dissipation resistance of inductors in a filter. The only bias supply is connected in series with a winding of the inductor, external to the negative resistance circuit. Three of the resistors form legs of a bridge, the inductor and bias supply are the fourth leg, and the transistor amplifier has input and output connected to respective diagonals.

This invention relates to a negative resistance network, and more particularly a network to compensate for the resistive dissipation in an inductor of a filter.

In the design of conventional LC (inductance-capacitance) filters the quality of performance achievable over the pass band is limited primarily by the dissipation in the inductors. This dissipation increases the pass-band loss by an amount proportional to the product of envelops delay and average component dissipation. To a first approximation the latter is fairly constant over the pass band, and the net result is that the beautifully flat pass-band response of the original non-dissipative filter design is changed into a scaled replica of the envelope delay characteristic.

A secondary effect of the component dissipation is to increase the sensitivity of the pass-band loss characteristic to tolerances in the element values. In a non-dissipative ladder filter, which is designed to provide, at the frequencies of minimum loss, maximum transfer of power from a resistive source to a resistive load, there is an automatic desensitizing of the pass-band loss to tolerances on the elements by virtue of the fact that all such reactive component errors occur in a substantially resistive circuit. The addition of dissipation tends to destroy this unity power factor situation and to worsen the sensitivity by about a factor of two.

There are three principal ways in which the dissipation effect over the pass band can be reduced. The classical method is to place in tandem with the filter an equalized network, usually a constant-resistance one, which builds up the filter loss to a larger, constant value. This is expensive in both components and design time, and the final filter has a flat loss which is probably at least 0.5 db greater than the maximum loss produced by the dissipation. But it has the advantage that the sensitivity to element tolerances is, at least, made no worse. If the filter characteristic drifts much with temperature, one is faced with the problem of arranging for the equalizer characteristic to drift similarly, otherwise the quality of equalization will suffer.

A second method of correcting form the dissipation effects is to predistort the original non-dissipative filter design in such a manner that, when the dissipation is added, the response is restored to the desired flat characteristic. This approach has the merit that it saves the components which, in the previous method, would be used in the equalizer.

The method has the serious drawwback, however, that the sensitivity of the pass-band loss to tolerances on the components, and particularly on one of the terminating resistances, is greatly increased. In sever cases, for example, it may be necessary to hold the return loss of the sensitive termination to better than 40 db to the nominal value in order to keep the pass-band response stable to 0.1 db. The flat loss of the final filter will be somewhat greater than for an equalized design and, moreover, there is a fairly sharp upper limit to the amount of dissipation which can be accounted for, although this is not a serious limitation. The practical difficulties in using such pre-distorted designs have prevented their general acceptance.

The third method is simply to cancel the dissipation by associating with each inductor a negative resistance. From a technical point of view this method is almost ideal: The extra design effort involved is only that of matching the values of the negative resistances to the positive dissipation resistances of the inductors; the overall flat loss of the final filter reverts to the zero value of the original non-dissipative design; and the sensitivity of the pass-band loss to element tolerances is minimized. Another advantage, not obtained with ether of the other two methods, is that the poles of loss in the stop bands will be sharpened; this would be significant, for example, if one were relying on such a pole to eliminate a pilot frequency.

The main reason why this method has not enjoyed any significant acceptance in the past has been the cost and suspected unreliability of the negative-resistance devices. Filters have traditionally been passive and ultra-reliable units and the idea of having them intimately associated with active elements, which needed frequent maintenance and replacement, was unattractive to the system designer. It was pessimistically assumed that a catastrophic failure of a negative resistance would completely block the operation of the filter and that a minor deviation from the correct value might cause the filter to oscillate.

The development of the transistor has now reached the stage where the cost of providing negative resistances is competitive with the cost of an equalizer, and where the reliability is approaching that of passive components.

In practice, inductor dissipation is represented fairly accurately by a combination of a series resistor and a shunt resistor, both of which will vary somewhat with frequency. However, the loss contribution of the series resistor usually tends to predominate and, for the purposes of the present argument, little error will be introduced if it is assumed that all the loss is represented by a single, frequently-independent, series resistor. The Q of the inductor is then strictly proportional to frequency and the dissipation factor $d_L$ is defined as $d_L=\omega/Q$=resistance/inductance.

Probably the most satisfactory general way of cancelling inductor dissipation, from the point of view of filter performance, is to place a negative resistance in series with the inductor. Normally this would require an open-circuit stable negative resistance.

The practical disadvantage of this scheme is that the value of the negative resistance usually turns out to be only a few ohms and is consequently difficult to make with good stability and an acceptable level of power consumption. The alternative is to place a short-circuit stable negative resistance in parallel with the inductor. This is not quite as satisfactory as a series resistance but the slight difference is detectable only in low-pass filters and critical wide-band band-pass filters. Again, however, there is the disadvantage that a negative resistance of the required value is difficult to make, for it will usually be in the order of several hundred thousand ohms.

An additional problem of applying a negative resistance, either series or shunt, to an inductor in a series branch of a filter is the need to use a common, grounded power supply. This latter condition means that it is much easier to provide a negative resistance which has one side grounded, and such a resistor can be connected to a non-grounded inductor only via a second winding. If one is forced to use a second winding anyway for this reason it then seems sensible to take advantage of the situation and use it as a means of matching the dissipation to the negative resistance so that the latter can be more easily made.

Although only the required shunt negative resistance can be changed in value with a secondary winding in this way, it nonetheless proves to be quite convenient. The most suitable value of negative resistance which can be made with simple transistor circuits is in the order of a few thousand ohms, and the number of turns needed on a secondary winding to match such a value to the equivalent shunt loss resistance will normally be only a small fraction of the total turns. This, together with the fact that thinner wire can often be used on the secondary winding, means that very little winding space need be wasted in providing coupling to the negative resistance. Inductors in shunt branches which are already grounded can provide the impedance matching merely by means of a tap.

Over the years a variety of circuits have been devised for producing negative resistances, each having its own special features. One special class of feedback circuit which has been extensively developed for this purpose has been designated the "negative impedance converter." The negative impedance converter is a two-terminal-pair network which presents at one terminal pair an impedance which is, apart from a possible scale factor, the negative of the impedance which is connected to the other terminal pair. If a positive resistance is connected to one terminal pair, the other terminal pair will present a negative resistance. Negative impedance converters can be made with either vacuum tubes or transistors and can be designed so that their performance is substantially independent of variations in the parameters of the tubes or transistors and have a quality limited only by the stability of the passive resistive element used. Of all known negative resistance devices, that formed by a resistance-terminated negative impedance converter is by far the most stable and linear. Its performance is perfectly satisfactory for the purpose of cancelling the dissipation resistance of an inductor. All presently known negative impedance converter circuits of adequate quality are more general in the facilities they offer than are necessary for the restricted purpose of providing a two-terminal negative resistance, and the provision of these facilities makes them unnecessarily complicated and expensive. Typical of these unnecessary facilities is the ability of the negative impedance converter to operate as a proper two-terminal-pair network with one terminal common to both terminal pairs and also the separation of the terminal pairs from the power supply. For the purpose of cancelling the dissipation resistance of an inductor it is not necessary to have a negative resistance of the very highest possible quality, but it must be simple, cheap, and easily made in compact form, and preferably it should operate down to zero frequency.

A most ingenious circuit providing an open-circuit stable negative resistance which is simple and inexpensive was described by M. Nagata: "A Simple Negative Impedance Circuit with No Internal Bias Supplies and Good Linearity," IEEE Transactions on Circuit Theory, vol. CT-12, pages 433–434, September 1965. However, since this circuit is open-circuit stable it cannot be used for connection in parallel with an inductor for the purpose of cancelling the dissipation resistance.

The principal object of this invention is to provide a simple short-circuit stable negative resistance network which has no internal bias supplies; and a specific object is to provide an arrangement using simple and reliable negative resistance networks to compensate for the resistive dissipation in the inductors of filters, to obtain improved performance.

According to the invention, a short-circuit stable negative resistance network is provided between a pair of terminals by connecting three resistors in series from the second of these terminals to the first, so that they form in effect three legs of a bridge with the circuits between the terminals being the fourth leg; and a two-stage transistor amplifier is connected with its input across one diagonal of the bridge and its output across the other diagonal, with the amplifier arranged so that the output current is reversed with respect to the input current. There are no internal bias supplies or coupling capacitors, and no other components within the negative resistance network except the resistors and the two transistors. The negative resistance network may be used in combination with filter inductors, with the two terminals connected either to the secondary winding of an ungrounded inductor, or to a tap of a grounded inductor in a shunt leg of the filter, and the power supply is connected in series with the winding connected to the two terminals.

The above-mentioned and other objects and features of this invention and the manner of attaining them will become more apparent, and the invention itself will be best understood, by reference to the following description of an embodiment of the invention taken in conjunction with the accompanying drawings, wherein.

Figure 1:
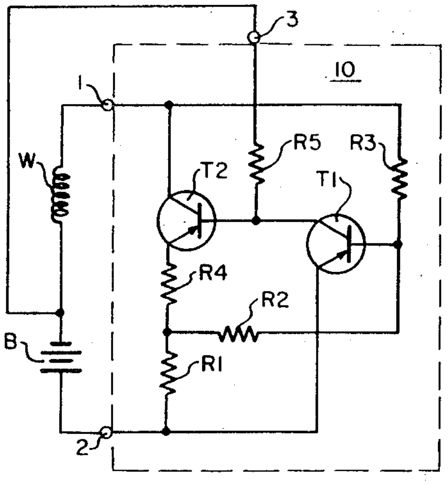
FIG. 1 is a schematic drawing of a negative impedance network according to the invention.

Referring to FIG. 1, the negative impedance network has a pair of terminals 1 and 2. From terminal 2 to terminal 1 within the network, resistors R1, R2 and R3 are connected in series. The amplifier portion uses as amplifier devices transistors T1 and T2. The transistor T1 has its base-electrode connected to the junction of resistors R2 and R3, its emitter electrode connected to terminal 2, and its collector electrode connected to the base electrode of transistor T2. Transistor T2 has its collector electrode connected to terminal 1 and its emitter electrode connected through a resistor R4 to the junction of resistors R1 and R2. A resistor R5 is connected from the junction point of the collector electrode of transistor T1 and the base electrode of transistor T2 to another terminal 3.

The external circuit to which the negative impedance network is connected includes an inductor winding W and a power supply B in series between terminals 1 and 2. The terminal 3 is connected directly to the power supply at its junction point with the winding. The resistors R4 and R5 adjust the operating voltages and currents.

In an alternative embodiment, the terminals 1 and 3 may be strapped together. This has the advantage that the network then requires only two external terminals instead of three. However, this arrangement gives a lower quality of negative resistance; it is more dependent upon the value of the bias voltage and upon variations in the transistor parameters. For some applications the reduced quality may nevertheless still be adequate and the reduction in number of external connections a worthwhile compensation.

Figure 2:
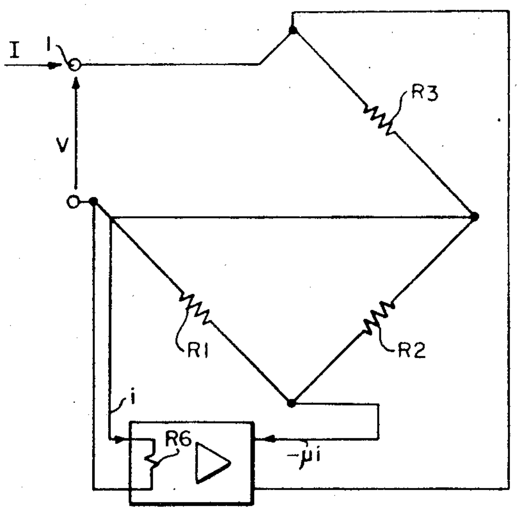
FIG. 2 is a representation of the negative impedance network in the form of a bridge with the transistor amplifier represented as a functional block.

One can consider the circuit of FIG. 1, after the fashion described by W. R. Lundry, "Negative Impedance Circuits—Some Basic Relations and Limitations," IRE Trans. on Circuit Theory, vol. CT–4, pp. 132–139, September 1957, as being a bridge with an amplifier connecting opposite pairs of terminals, as shown in FIG. 2. Assuming that the amplifier is an ideal current-controlled current source (zero input impedance, infinite output impedance) with a current gain of $\mu$, one can readily derive for this circuit the input-impedance expression:

$$\frac{V}{I}=-R3\frac{R1+(R1+R2)/\mu}{R2-(R1+R2)/\mu} \quad (1)$$

As $\mu\rightarrow\infty$ the impedance tends to $-R3R1/R2$ which is the negative of the impedance required to balance the bridge.

The dependence of the impedance upon frequency is determined mainly by the amplifier. To a first approximation:

$$\frac{1}{\mu}=\frac{1+p/\omega_0}{\mu_0} \quad (2)$$

where $\mu_0$ is the gain at zero frequency, $p=j2\pi f$, and $\omega_0/2\pi$ is the frequency at which the gain is down by 3 db. Substituting (2) into (1), the impedance is seen to be a bilinear expression in $p$ with its zero in the left-half plane and its pole in the right-half plane. The stability of the impedance when short-circuited is determined by the location of its zero, and when open-circuited, by the location of its pole. The expression is short-circuit stable because the pole is in the left-half plane.

MODE OF OPERATION

Figures 3, 4:
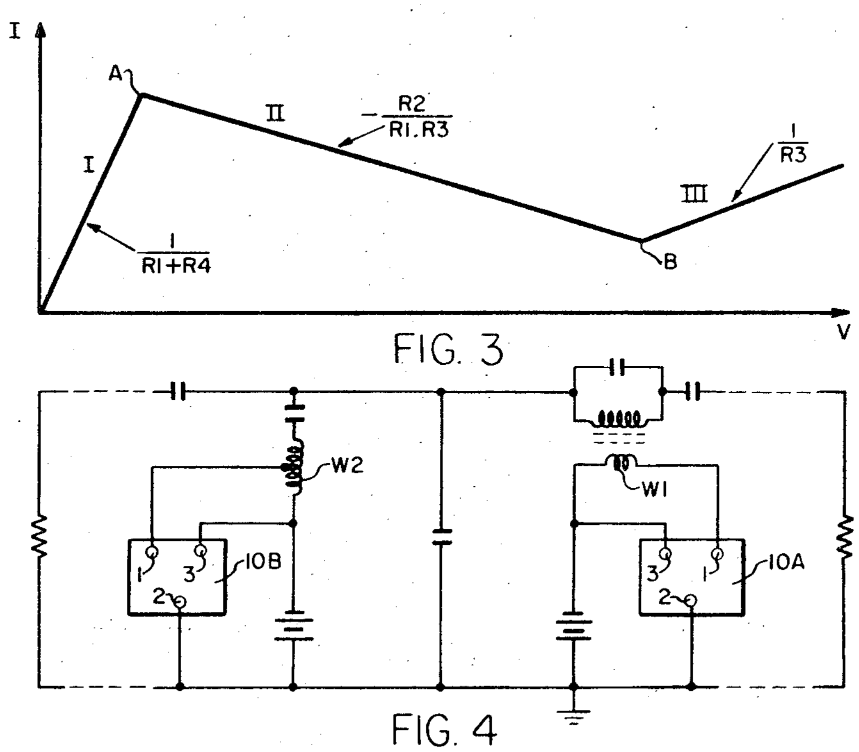
FIG. 3 is a graph showing the voltage-current characteristic of the network.
FIG. 4 is a diagram showing how the negative impedance network is used with the inductors of a filter.

With terminals 2 and 3 in FIG. 1 connected to a fixed battery supply the current-voltage characteristic at terminals 1 and 2 takes the form shown in FIG. 3. It consists of three quite distinct linear regions. In region I the voltage at the base of T1 is not high enough to turn the transistor on, and the collector voltage on T2 is so low that it is saturated by the base current supplied through R5. This places R1, R4 and the saturation resistance, emitter-collector, of T2 in series across the input terminals. The slope in this region is very nearly $1/(R1+R4)$. The current in R3 is negligible.

At point A the current I through R1 builds up just enough voltage ($IR1\cong0.6$ V) to switch on T1. Any further increase in the applied voltage will increase the base current in T1 which is amplified and acts to reduce the current in T2. This gives a net reduction in the total input current and is responsible for the negative resistance in region II. With sufficient gain this slope settles down to $-R2/R1R3$ as indicated in Equation 1 above.

Eventually, with sufficient applied voltage, T2 will cut off; this occurs at point B. The only path for the input current is then through R3 and the base-emitter resistance of T1. The slope in region III is thus very nearly 1/R3.

Resistor R4 is included to increase the voltage appearing on the collector of T1 in region II and so increase the signal handling capacity of the transistor. Unfortunately the presence of R4 also reduces the amplifier gain so the lowest possible value should be chosen.

The equations given above for the three different regions are sufficiently accurate to allow the macroscopic behavior of the circuit to be predicted and hence, by a little cut and try, for the circuit to be designed to meet a given negative resistance and operating level.

In order to assess the quality of negative resistance obtained in region II it is necessary—

(i) to extend Equation 1 so as to include the effect of the amplifier input resistance (for silicon transistors the output resistance is so high that it can safely be ignored) and (ii) to estimate the value of $\mu$.

With a non-zero input resistance, R6, to the amplifier shown in FIG. 2 the expression for the negative resistance becomes:

$$\frac{V}{I}=-\frac{R3R1}{R2}\,\frac{1+\frac{R1+R2+R6}{\mu R1}+\frac{R6(R1+R2)}{\mu R1R3}}{1-\frac{R1+R2+R6}{\mu R2}} \quad (3)$$

in which:

$$\mu=\frac{\beta_1\beta_2R5}{(\beta_2+1)(R1+R4)+R5} \quad (4)$$

A SPECIFIC DESIGN

If the circuit is to be used in the fashion shown in FIG. 4 it should conveniently operate directly from the full available battery supply. Here a value of 21 volts was chosen as being fairly typical. With the center of the negative resistance characteristic set at this voltage it should then be possible to handle a swing of ±10 volts around the operating point. The value of the negative resistance was tentatively chosen as −10 kilohms (kΩ).

For any given choice of R3 the line defining region III of the overall characteristic is fixed, and the voltage at which it joins the −1/10 kΩ slope of region II (point B) can then be controlled by adjusting the current $I_0$, drawn at the operating point. For the 21 volt point to be in the center of region II point B has to occur around 42 volts and then $$I_0=\frac{21\ V}{10\ k\Omega}+\frac{42\ V}{R3}$$

As a compromise between a high value for R3 and a high operating current, R3 was set at 21.5 kΩ giving $I_0\cong4$ ma.

Point A must therefore occur with I just below 6 ma. and R1 consequently is slightly larger than 0.6 $V$/6 ma.=100Ω. A value of 110Ω was selected. R2 is then set by the condition $R1R3/R2=10$ kΩ which gives $R2=237\Omega$. R4 was chosen at the smallest value (178Ω) that gives just enough collector voltage for satisfactory operation of T1 and R5 was set at 21.5 kΩ to allow 1 ma. collector current in T1.

By measurement at the operating point of the transistors used (2N3250A), $$\beta_1=90 \qquad \beta_2=225 \qquad R_6=2500\Omega$$

whence, from (4):

$$\mu=\frac{90\times225\times21500}{226\times288+21500}$$
$$=5028$$

The measured value of $R3R1/R2$ was 10,400Ω. The various terms in (3) are then:

$$\frac{V}{I}=-10{,}040\times\frac{1+0.005147+0.000073}{1-0.002389}$$
$$=10{,}040\times1.007626$$
$$=10{,}117$$

The imperfections in the amplifier, i.e., the fact that $\mu$ is not infinite and R6 not zero, thus cause the negative resistance to exceed the asymptotic value of $R1R3/R2$ by only 0.76%. For all practical purposes this percentage is directly proportional to R6 and inversely proportional to $\mu$.

The circuit arrangements for applying the negative resistance in a typical band-pass filter are shown in FIG. 4. Inductors in some branches which are already grounded can provide the impedance matching merely by means of a tap. Thus a negative resistance network 10A corresponding to network 10 of FIG. 1 is connected to a series branch of the filter by means of a winding W1 on the inductor, this secondary winding W1 being connected from terminal 1 to the negative pole of a battery. The terminal 2 is connected to the grounded positive pole, and terminal 3 is connected directly to the negative pole of the battery. Similarly, a negative resistance network 10B corresponding to the network 10 of FIG. 1 is connected to a shunt branch of the filter by means of a tap with a section W2 of the inductor appearing between terminal 1 and the negative pole of the battery. Terminal 2 is connected to the grounded positive pole and terminal 3 is connected directly to the negative pole.

An inductor shunted by a negative resistance evidently can give exact cancellation of a constant positive series resistance only at one single frequency. However, in narrow-band filters the resulting error committed in the loss characteristic is quite negligible and even in wideband filters, notably low-pass filters, it proves to be of little consequence. However, that fraction of the dissipation which is properly represented by a shunt resistance is correctly cancelled by the negative resistance and does not contribute to the frequency dependent behaviour, and also the series resistance component of the dissipation itself increases with frequency. With proper adjustment of the negative resistances, it can be expected that a pass band flat to within 0.1 db can normally be achieved.

At some sacrifice in flatness some economy can be realized by omitting the negative resistance network on some of the inductors of a filter and by over-compensating with those on the remainder. By computation it can be determined which inductors contribute most to the dissipation effect and start by fitting negative resistances to these.

With exact cancellation of the dissipation a single tuned circuit would have infinite Q and, if removed from the filter, would as a separate item be on the verge of free oscillation, so that a small increase in the magnitude of the negative resistances would then cause it to oscillate with exponentially increasing amplitude up to the point at which the negative resistance becomes overloaded. However, if all of the components are kept wired as a complete filter, and the filter is properly terminated with its design resistances, the situation is entirely different. The damping provided by these resistive terminations is a very powerful deterrent to self oscillation and there is now no danger of instability if the negative resistances overcompensate the positive dissipation resistances by a modest amount. Usually, unless the original dissipation is excessive, it is, in fact, possible to overcompensate to the extent of actually reversing the sign of the effective dissipation without the circuit becoming unstable. The margin on the safety of the values of the negative resistances is extremely large. There is the possibility that oscillation might just occur if *both* terminating resistors were removed from the filter simultaneously, but then, of course, the oscillation could be detected only by virtue of crosstalk in other circuits.

A catastrophic failure of the negative resistance would most likely result in it going either short circuit or open circuit. In the former case it would short circuit the associated inductor, and although, of course, this would degrade the filter performance it would not normally completely interrupt service. In the latter case the effective Q of the inductor would merely drop to its original value and the loss at the pass-band edge frequency would rise slightly; this effect would probably pass unnoticed until the next routine test of system frequency response.

CONCLUSION

The circuit arrangement of the negative-resistance network, with only two transistors and five resistors, appears to be as simple as one could reasonably hope for. The performance is more than adequate for the purpose of cancelling dissipation in an inductor of a filter where the limiting factor, just as with more conventional methods of equalization, is the variation of inductor dissipation with temperature.

What is claimed is:

1. A combination comprising a short-circuit stable negative resistance network having a first and a second input terminal between which the negative resistance is effective, and a circuit providing a direct-current path which includes an inductor winding and a source of direct-current bias potential in series connected between the first and second terminals;

wherein said negative resistance network comprises:

first, second and third resistors connected in series from the second terminal to the first terminal;

a first signal amplifier device, including a first electrode connected to the second terminal, a second electrode, and a control electrode connected to the junction of the second and third resistors, a second signal amplifier device, including a first electrode connected via a direct current path to the junction of the first and second resistors, a second electrode connected to the first terminal, and a control electrode connected to the second electrode of the first amplifier device, the first and second signal amplifier devices being of the same conductivity type, a fifth resistor connected from the second electrode of the first amplifier device to a third terminal which is connected via a direct current path to the same pole of the bias source as said first terminal, said source providing the only bias to said network;

said network providing a voltage-current characteristic between the first and second terminals having a first region in which the first amplifier device is biased to cutoff and the second amplifier device is biased to saturation so that the effective resistance between the first and second terminals is positive and approximately equal to the resistance between the first electrode of the second amplifier device and the second terminal, a second region in which the effective resistance is negative with both amplifier devices biased into the active portion of their characteristic, with the input current from the first terminal through the third resistor providing an input signal from the control electrode to the first electrode of the first amplifier device to the second terminal, and the output signal at the second electrode of the first amplifier device provides an input signal from the control electrode to the first electrode of the second amplifying device to control the current flow between the first and second electrodes of the second amplifier device inversely to the input signal current to the first amplifier device, and a third region in which the second amplifier device is biased to cutoff, so that the effective resistance between the first and second terminals is positive and approximately equal to the value of said third resistor.

2. A combination including a negative resistance network as claimed in claim 1, wherein said first and second signal amplifier devices are transistors of the same conductivity type.

3. A combination including a negative resistance network as claimed in claim 2, wherein said third terminal is connected directly to said bias source.

4. A combination including a negative resistance network as claimed in claim 2, wherein said transistors are PNP type and said first and third terminals are coupled to the negative pole of the bias source.

5. An electrical filter circuit including the combination as claimed in claim 2, wherein said inductor winding is coupled to an inductor of the filter circuit.

6. A filter circuit as claimed in claim 5, wherein said winding is a secondary winding of an inductor in a series branch of the filter.

7. A filter circuit as claimed in claim 5 wherein said winding is a section of an inductor in a shunt branch of the filter, provided by a tap on the inductor.

8. A filter circuit as claimed in claim 5, wherein a plurality of said negative resistance networks are coupled to separate inductors thereof.

9. A filter circuit as claimed in claim 8, wherein said negative resistance networks are coupled to at least one inductor of a series branch and one inductor of a shunt branch.

References Cited

UNITED STATES PATENTS

| | | | |
|---|---|---|---|
| 2,726,370 | 12/1955 | Linvill et al. | |
| 2,730,680 | 1/1956 | Bangert. | |
| 3,384,844 | 5/1968 | Meacham | 333—80 |

HERMAN K. SAALBACH, Primary Examiner

C. BARAFF, Assistant Examiner

U.S. Cl. X.R.

307—289